(12) United States Patent
Rupp et al.

(10) Patent No.: US 8,056,007 B2
(45) Date of Patent: Nov. 8, 2011

(54) SYSTEM AND METHOD FOR RECOGNIZING AND STORING INFORMATION AND ASSOCIATED CONTEXT

(75) Inventors: Jason Rupp, San Francisco, CA (US); Mohammad Rafiushan Khan, San Francisco, CA (US)

(73) Assignee: Yahoo! Inc., Sunnyvale, CA (US)

( * ) Notice: Subject to any disclaimer, the term of this patent is extended or adjusted under 35 U.S.C. 154(b) by 704 days.

(21) Appl. No.: 11/600,667

(22) Filed: Nov. 15, 2006

(65) Prior Publication Data
US 2008/0115086 A1 May 15, 2008

(51) Int. Cl.
*G06F 17/27* (2006.01)

(52) U.S. Cl. ........ 715/255; 715/230; 715/231; 715/232; 715/233; 715/254; 715/256

(58) Field of Classification Search .......... 715/230–233, 715/254
See application file for complete search history.

(56) References Cited

U.S. PATENT DOCUMENTS

| | | | | |
|---|---|---|---|---|
| 5,889,993 A * | 3/1999 | Kroeger et al. | ........... | 717/128 |
| 5,948,040 A | 9/1999 | DeLorme et al. | | |
| 6,025,932 A * | 2/2000 | Imanaka | ........... | 382/238 |
| 6,839,719 B2 * | 1/2005 | Wallace | ........... | 707/104.1 |
| 6,917,926 B2 * | 7/2005 | Chen et al. | ........... | 706/12 |
| 6,931,647 B1 * | 8/2005 | Firth et al. | ........... | 719/332 |
| 6,968,509 B1 * | 11/2005 | Chang et al. | ........... | 715/802 |
| 7,254,569 B2 * | 8/2007 | Goodman et al. | ........... | 707/1 |
| 7,281,008 B1 | 10/2007 | Lawrence et al. | | |
| 7,379,889 B2 | 5/2008 | Ratzlaff et al. | | |
| 7,398,268 B2 * | 7/2008 | Kim et al. | ........... | 707/3 |
| 7,437,353 B2 | 10/2008 | Marmaros et al. | | |
| 7,441,194 B2 | 10/2008 | Vronay et al. | | |
| 7,467,232 B2 * | 12/2008 | Fish et al. | ........... | 709/246 |
| 7,519,566 B2 * | 4/2009 | Prigogin et al. | ........... | 706/21 |
| 7,539,747 B2 * | 5/2009 | Lucovsky et al. | ........... | 709/224 |
| 7,548,932 B2 * | 6/2009 | Horvitz et al. | ........... | 707/102 |
| 7,558,925 B2 * | 7/2009 | Bouchard et al. | ........... | 711/154 |
| 7,596,571 B2 | 9/2009 | Sifry | | |
| 7,685,202 B2 | 3/2010 | Kasahara et al. | | |
| 7,801,782 B2 | 9/2010 | DeAddio et al. | | |
| 2001/0049617 A1 | 12/2001 | Berenson et al. | | |
| 2002/0194388 A1 * | 12/2002 | Boloker et al. | ........... | 709/310 |
| 2003/0200192 A1 | 10/2003 | Bell et al. | | |
| 2004/0199498 A1 | 10/2004 | Kapur et al. | | |
| 2005/0021485 A1 * | 1/2005 | Nodelman et al. | ........... | 706/21 |
| 2005/0044066 A1 | 2/2005 | Hooper et al. | | |
| 2005/0108233 A1 | 5/2005 | Metsatahti et al. | | |

(Continued)

OTHER PUBLICATIONS

Davison et al.; Predicting Sequences of User Actions; Proceedings of the 1998 AAAI/ICML Workshop "Predicting the Future: AI Approaches to Time-Series Analysis;" 1998; pp. 1-8.*

(Continued)

*Primary Examiner* — Doug Hutton, Jr.
*Assistant Examiner* — Andrew Dyer
(74) *Attorney, Agent, or Firm* — James J. DeCarlo; Greenberg Traurig, LLP

(57) ABSTRACT

The present disclosure provides a system and method of collecting information and associated context. Information and associated context are collected by monitoring at least one application program executable using the computing system, so as to detect one or more events associated with the at least one application program; identifying contextual information corresponding to the detected one or more events; and storing information associated with the at least one detected event, the stored information including the identified contextual information.

30 Claims, 14 Drawing Sheets

U.S. PATENT DOCUMENTS

Figure 1A:
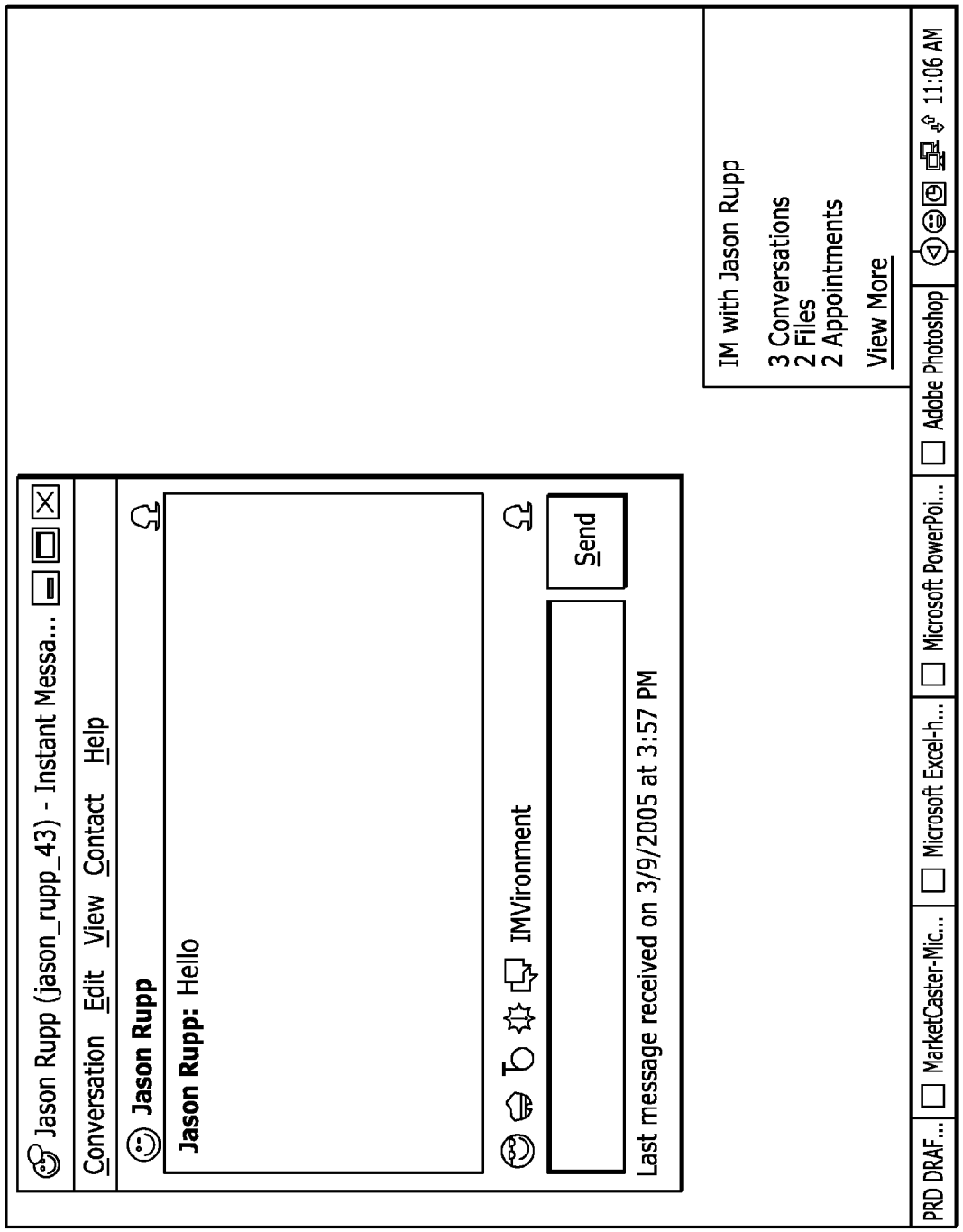

| | | | |
|---|---|---|---|
| 2005/0240596 | A1 | 10/2005 | Worthen et al. |
| 2005/0273702 | A1 | 12/2005 | Trabucco |
| 2006/0000900 | A1 | 1/2006 | Fernandes et al. |
| 2006/0179415 | A1 | 8/2006 | Cadiz et al. |
| 2006/0271520 | A1* | 11/2006 | Ragan .......................... 707/3 |
| 2006/0271827 | A1 | 11/2006 | Cascaval et al. |
| 2007/0060112 | A1 | 3/2007 | Reimer |
| 2007/0250784 | A1 | 10/2007 | Riley et al. |
| 2007/0260567 | A1* | 11/2007 | Funge et al. .................. 706/47 |
| 2007/0299631 | A1 | 12/2007 | Macbeth et al. |
| 2008/0059419 | A1 | 3/2008 | Auerbach et al. |
| 2008/0115149 | A1 | 5/2008 | Rupp et al. |
| 2008/0120396 | A1 | 5/2008 | Jayaram et al. |
| 2008/0154912 | A1 | 6/2008 | Weber et al. |
| 2008/0222170 | A1 | 9/2008 | Farnham et al. |

OTHER PUBLICATIONS

Gorniak et al.; Predicting Future User Actions by Observing Unmodified Applications; 2000; AAAI-00 Proceedings; pp. 1-6.*

Kroeger et al.; Predicting Future File-System Actions From Prior Events; Proceedings of the USENIX 1996 Annual Technical Conference; Jan. 1996; pp. 1-11.*

Office Action from U.S. Appl. No. 11/600,359 dated Aug. 21, 2008.

Sauermann, et al., "Semantic Desktop 2.0: The Gnowsis Experience", Proceedings of the 5th International Semantic Web Conference, ISWC 2006, (Nov. 5-9, 2006), pp. 887-900 http://www.springerlink.com/content/97322418h3201014/.

Liberman, H. et al., "Out of Context: Computer systems that adapt to, and learn from, context", IBM Systems Journal, vol. 39, No. 3&4 (2000), pp. 617-632 http://eee.cse.nd.edu/~cpoellab/teaching/cse40827/papers/context1.pdf.

Chirita, P., et al. "Activity Based Metadata for Semantic Desktop Search" Proceedings of the Second European Semantic Web Conference, (May 29-Jun. 1, 2005), pp. 439-454 http://www.springerlink.com/content/q3yrwa5e1vklj33v/.

Liberman, H., Autonomous Interface Agents, Proceedings of the SIGCHI conference on Human factors in computing systems (CHI '97). ACM, New York, NY, USA, (1997), pp. 67-74. http://portal.acm.org/ft_gateway.cfm?id=258592.

Microsoft Corp., "Introducing the Microsoft Office Information Bridge Framework" (May 2004) pp. 1-9 http://msdn.microsoft.com/en-us/library/aa679800(office.11,printer).aspx Sep. 8, 2010.

Microsoft Corp., "Technical Overview of Information Bridge Framework" (May 2004), pp. 1-16 http://msdn.microsoft.com/en-us/library/aa679802(office.11,printer). Sep. 8, 2010.

Maxson, C., "Building User Interfaces with the Information Bridge Framework" (May 2004), pp. 1-11 http://msdn.microsoft.com/en-us/library/aa679799(office.11,printer). Sep. 8, 2010 .

Dey, A.K., "Context-Aware Computing: The CyberDesk Project," American Association for Artificial Intelligence '98 Spring Symposium, Stanford University (Mar. 23-25, 1998), pp. 51-54 http://www.aaai.org/Papers/Symposia/Spring/1998/SS-98-02/SS98-02-008.pdf Sep. 8, 2010.

Kim, P.; Podlaseck, M.; Pingali, G., "Personal Chronicling Tools for Enhancing Information Archival and Collaboration in Enterprises" CARPE'04 (Oct. 15, 2004), New York, New York, pp. 56-65 http://portal.acm.org/ft_gateway.cfm?id=1026662 Sep. 8, 2010.

Microsoft Computer Dictionary, 5th edition ( 2002), pp. 198-199.

IEEE 100 The Authoritative Dictionary of IEEE Standards Terms, 7th edition (2000), p. 398.

Davis, M., S. King, N. Good, and Risto Serves. From Context to Content: Leveraging Context to Infer Media Metadata. Proceedings of the 12th annual ACM international conference on Multimedia (Oct. 10-14, 2004). pp. 188-195.

Friedman, Nat, "XIMIAN Dashboard", Jul. 25, 2003, pp. 1-23 [retrieved from nat.org/dashboard/ols2003/ols2003-dashboard.ppt].

Ames, M.; Dennis, T.; Hill, B.; Poon, S.; Wooldridge, M. PicturePortal Final Presentation, SIMS 2002: Fall 2004 Class (2004) (UC Berkeley School of Information Management & Systems) [retrieved from http://www2.sims.berkeley.edu/academics/courses/is202/f04/phone_project/Group4/PicturePortal.ppt on May 7, 2010], pp. 1-20.

Ames, M.; Dennis, T.; Hill, B.; Poon, S.; Wooldridge, M. PicturePortal Website (2004) [retrieved from http://www2.sims.berkeley.edu/academics/courses/is202/f04/phone_project/Group4/ on May 7, 2010], pp. 1-2.

Manguy, L., S. Fisher, J. Parada, C. Burgener, C. Madhwacharyuia, J. Antin, iTour Final Presentation from Project Group # 6, SIMS 202: Fall 2004 Class (UC Berkeley School of Information Management & Systems) [retrieved from http://www2.sims.berkeley.edu/academics/courses/is202/f04/phone_project/Group6/iTour%20Slides.ppt on Dec. 29, 2009], pp. 1-8.

Mitnick, S., C. Nigro, P. Poling, D. Thaw, S. Yardi, Pillbox Final Presentation from Project Group #8, SIMS 202: Fall 2004 Class (UC Berkeley School of Information Management & Systems).[retrieved from http://www2.sims.berkeley.edu/academics/courses/is202/f04/phone_project/Group8/ presentation.php on Dec. 29, 2009], pp. 1-16.

* cited by examiner

Figure 1B

| | |
|---|---|
| Phone Numbers | 123-456-7890<br>123 456 7890<br>123456 7890<br>123456-7890<br>123-4567890<br>1234567890<br>123-4567<br>1234567<br>(123)456-7890<br>(123) 456-7890<br>(123) 456 7890<br>(123) 4567890 |
| Instant Messenger | messenger ID, full name<br>Messenger ID, Full Name |
| City Names | city names |
| Zip Codes | Zip codes in standard zip and zip+4 format |
| Local Queries | 'restaurant' + (City Name or Zip Code)<br>'Restaurant' + (City Name or Zip Code)<br>'restaurants' + (City Name or Zip Code)<br>'weather' + (City Name or Zip Code) |
| Package Tracking information | UPS 1z9999999999999999<br>Fed Ex<br>USPS 7000 0000 0000 0000 0000 |
| Addresses | Use address matching technology to identify US addresses. |

Figure 3

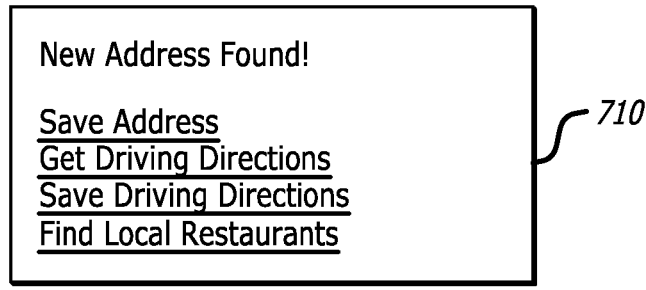

☐ Jason Rupp ▷

Communiqués with Jason Rupp (in the past 30 days):
 Emails - (23)
 Web pages from Jason Rupp that I visited
 Yahoo Messenger Conversations - (5)
 AIM Conversations - (unknown) (set AIM id)
Files recently shared with Jason Rupp (in the past 30 days):
 DRAFT - Skiing.doc
 Skiing.ppt
 Skiing.doc
Yahoo Network Results:
 360 Blast: I love fish from Japan (go to 360 profile)
 Photos:    Skiing in Tahoe (view album)
Address Book Profile:
Phone: (415) 555-1212 (call)
Address: 1 First Ave.
         A3329
         Sunnyvale, CA 12345

750

Edit  View  Favorites  Tools  Help
⟵ ▸ | ⌂ | ☒ | | 🔍 Search ☆Favorites | ○ | | 📷

Inbox | ☐
Arranged By: Date | Newest on top ▷
◢ ✉ Jason Rupp          6/6/2005 ▷
   RE: Patent/Sherpa
  ✉ Jason Rupp          6/6/2005 ▷
   RE: patent application
  ✉ Jason Rupp          6/6/2005 ▷
   RE: Share This meeting tomorrow
  ✉ Apple Developer Connection 6/6... ▷
   June 6 WWDC Attendee Update
  ✉ Rob Aseron          6/6/2005 ▷
   RE: Share This meeting tomorrow
  ✉ Matt Leacook        6/6/2005 ▷
   RE: Share This meeting tomorrow
  ✉ Chris Moeller       6/6/2005 ▷
   RE: Share This meeting tomorrow RE: profile
Jason Rupp
To: David M Ishimaru;
Attachments ☐ Inv David,
The invention disclo
Please review and
clarification in any
Let me know what Thanks!
Jason From: David M Ishimaru
Sent: Wednesday, May 04, 2005 11:25 AM

*Figure 7F*

SYSTEM AND METHOD FOR RECOGNIZING AND STORING INFORMATION AND ASSOCIATED CONTEXT

FIELD OF THE DISCLOSURE

The present disclosure relates to a system and method for context information associated with detected events, and more particularly to a system and method of recognizing occurrence of an event in a computing system, and identifying information associated with the event, including context information, which information can be stored for subsequent retrieval.

BACKGROUND

Computers are being used more and more to retain various types of information in electronic form. For example, computers can be used to store word processing documents, spreadsheets, correspondence (e.g., electronic mail and facsimile), contact information, calendars, instant messages, and the like.

In a conventional computer system, information is stored in one or more files maintained by a file system component of the computer system. A user can input a file name to retrieve the file (e.g., a file containing a word processing document) from the file system. However, many times a user cannot remember the file name, or even the context in which a file was used, for example Some software applications provide a listing of a limited number of the most recent files opened by the application in a listing when a user elects to open a file, in order to provide a shortcut for use in opening a file within the software application. If the file does not appear in this list, however, the user must use other means for identifying the file. For example, if the user remembers a portion of the file's name used to save the file, the user can search the file system to locate the file. A file system browse feature is typically available to the user from within a file open dialog screen, which allows the user to traverse the file system to locate the file. Alternatively, a user can use a search tool that resides on the user's "desktop". For example, Microsoft Windows® has a search tool, which allows the user to search based on a file's attributes, such as name, contents, location, modification date, data type. Once the file is located, it can be displayed for the user to select. Other search tools are available, such as the Desktop Search tool from Yahoo!®.

SUMMARY

The present disclosure seeks to address failings in the art and to provide a system and method for recognizing and storing context information associated with an information item.

Context information can comprise circumstantial information related to a previous experience with an information item, for example. Context information can be related to an event, e.g., in connection with an application program, the occurrence of which is connected to one or more information items, for example. By way of a further non-limiting example, an event, such as a process start, process stop, file (or other item) open, file (or other item) close, a spawned process, is identified, and information and context associated with the event is identified. For example, if a user is working in an electronic mail application, and receives an electronic mail message that has a word processing document as an attachment. If the user elects to open the attachment, embodiments of the present disclosure recognize the file open operation as an event and broadcast a message which contains information about the detected event, e.g., what applications were open at the time of the event, the fact that the file was received as an attachment to an electronic mail message, the sender of the electronic mail message, the recipients of the electronic mail message, the contents of the electronic mail message, the date of the electronic mail message, etc. Embodiments of the present disclosure store some or all of the information about the event, including context, or contextual, information. It should be apparent that the stored information can be used to subsequently identify the file. For example, the stored information can be used to identify a file that was received in an electronic mail message sent by "Jane Doe".

Context information can be used to identify an associated information item. By way of other non-limiting examples, context information can identify a person or system component involved in a process start/stop, information associated with a file (or other item) that is opened or closed, such as a file name, location, etc., information identifying a circumstance (e.g., reason) a new process is spawned, etc. The context information is indexed and related to information items, such that the context information can be used to identify one or more information items.

In accordance with one aspect, information and associated context are collected by monitoring at least one application program executable using the computing system, so as to detect one or more events associated with the at least one application program; identifying contextual information corresponding to the detected one or more events; and storing information associated with the at least one detected event, the stored information including the identified contextual information.

In accordance with another aspect, a system of collecting information and associated context comprising a plurality of clients, each client corresponding to an application program and operative to monitor its corresponding application so as to detect an occurrence of one or more events associated therewith; a context engine operative to identify context information corresponding to the detected one or more events; an index and search engine operative to store information associated with at least one detected event, the stored information including the identified contextual information.

DRAWINGS

The above-mentioned features and objects of the present disclosure will become more apparent with reference to the following description taken in conjunction with the accompanying drawings wherein like reference numerals denote like elements and in which:

Figure 1B:
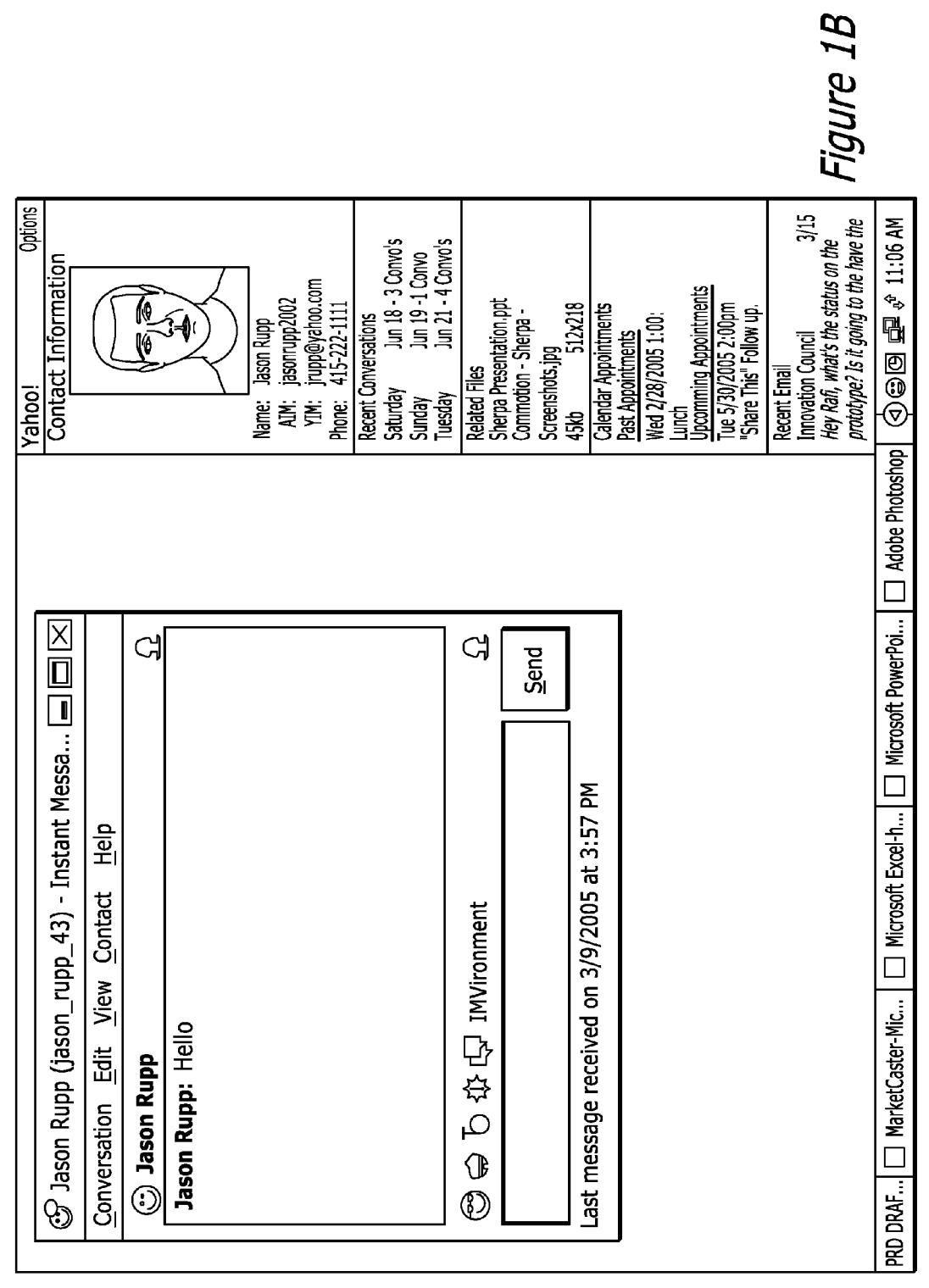

FIG. 1, which comprises FIGS. 1A and 1B, provides examples of information displayed in accordance with one or more embodiments of the present disclosure.

Figure 2:
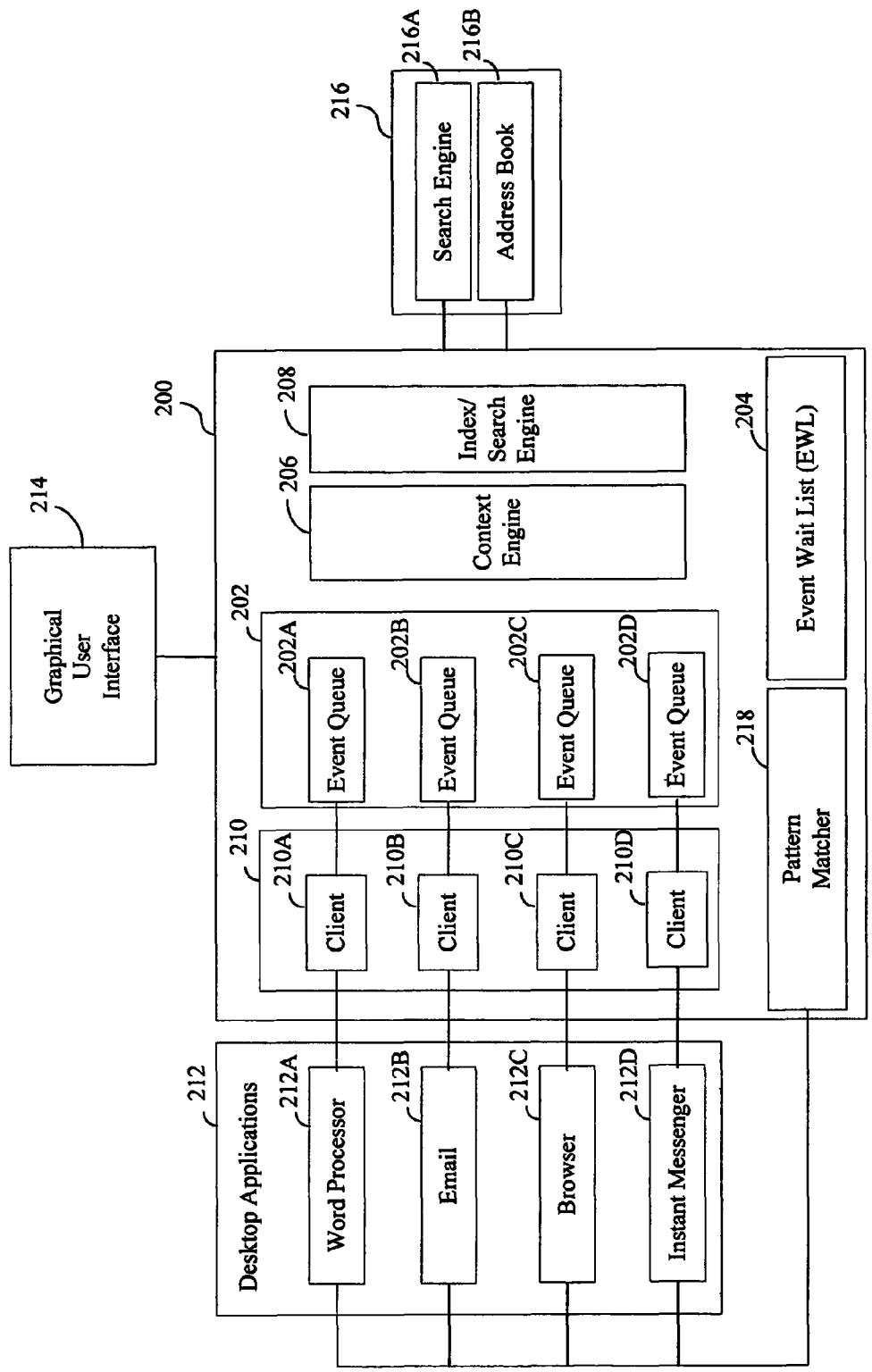

FIG. 2 provides an architectural overview in accordance with embodiments of the present disclosure.

FIG. 3 provides examples of pattern matching expressions used in one or more embodiments of the present disclosure.

Figure 4A:
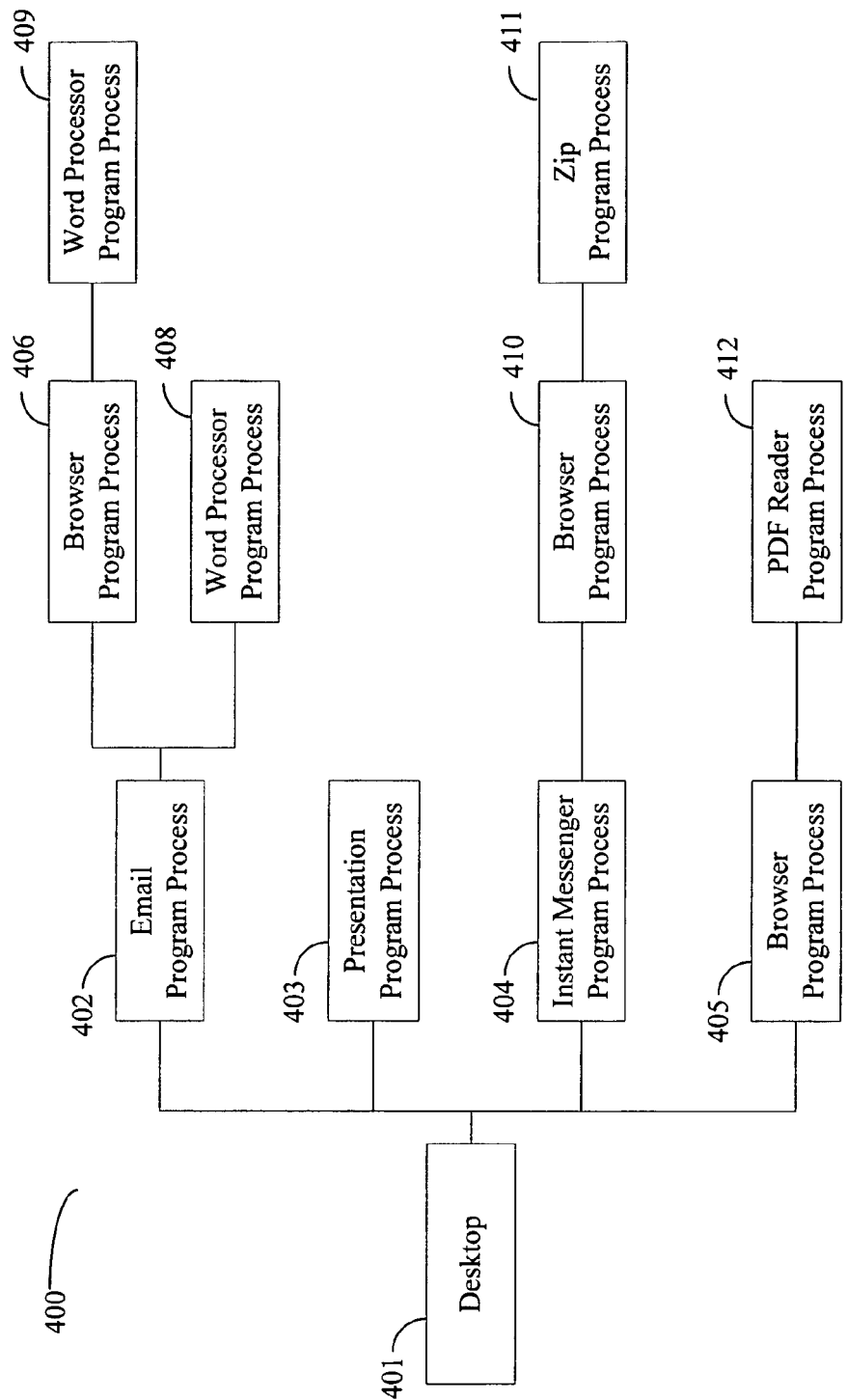
Figure 4B:
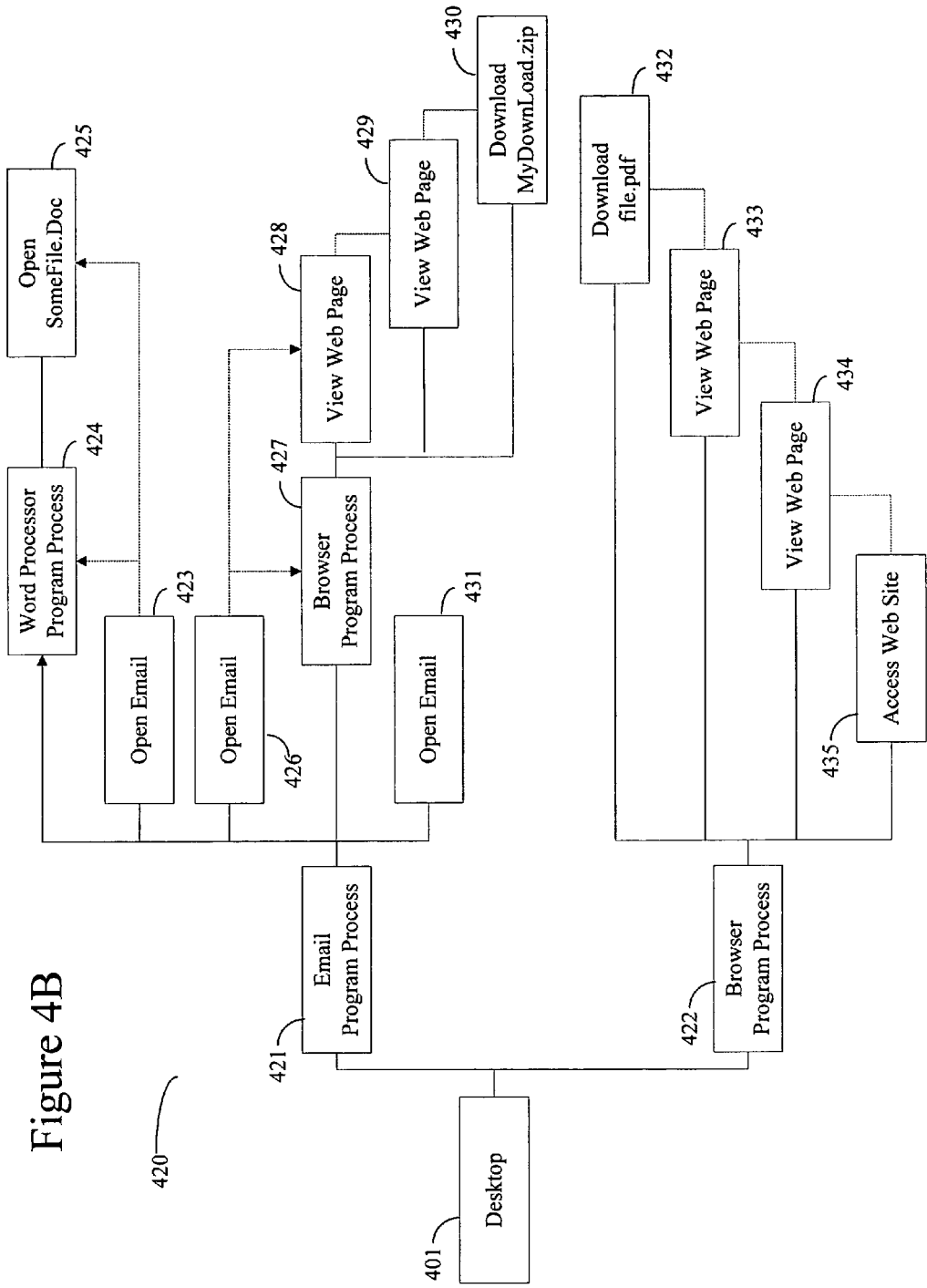

FIG. 4, which comprises FIGS. 4A and 4B, provides examples of context graphs in accordance with one or more embodiments of the present disclosure.

Figure 5:
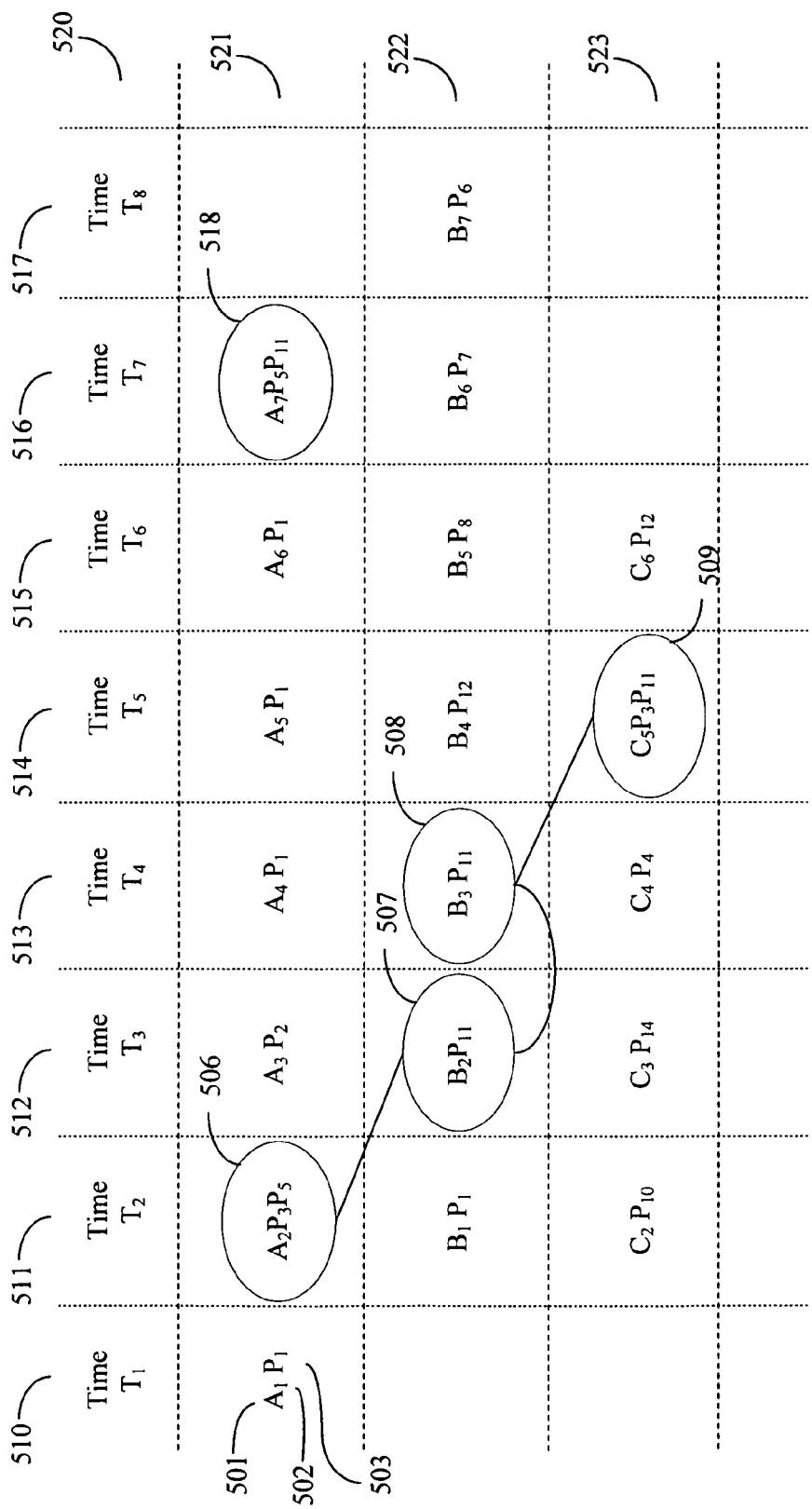

FIG. 5 provides an example of events and relationships based on time and pattern matches in accordance with at least one embodiment of the present disclosure.

Figure 6:
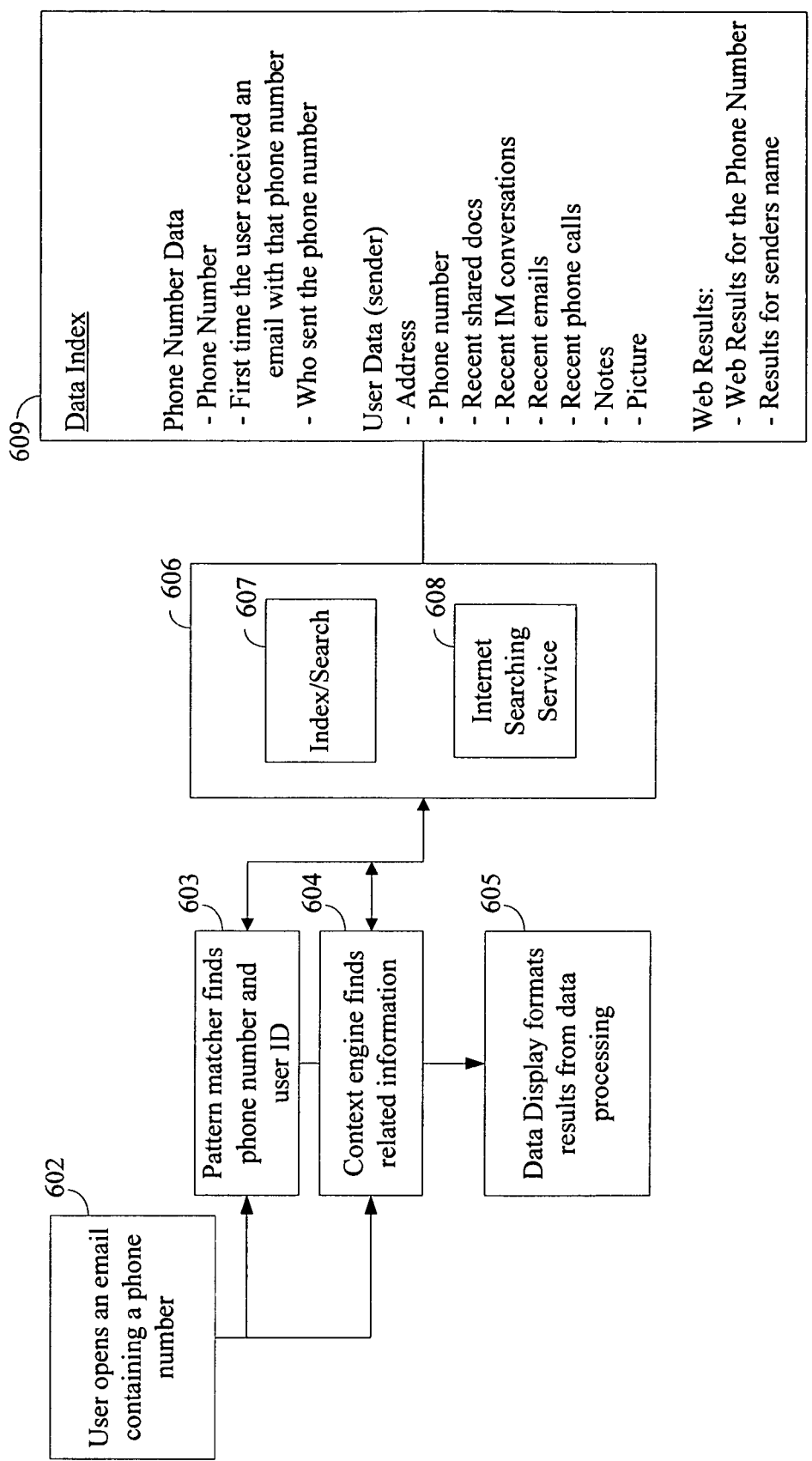

FIG. 6 provides an example of a processing performed in accordance with one or more embodiments of the present disclosure.

Figure 7A:
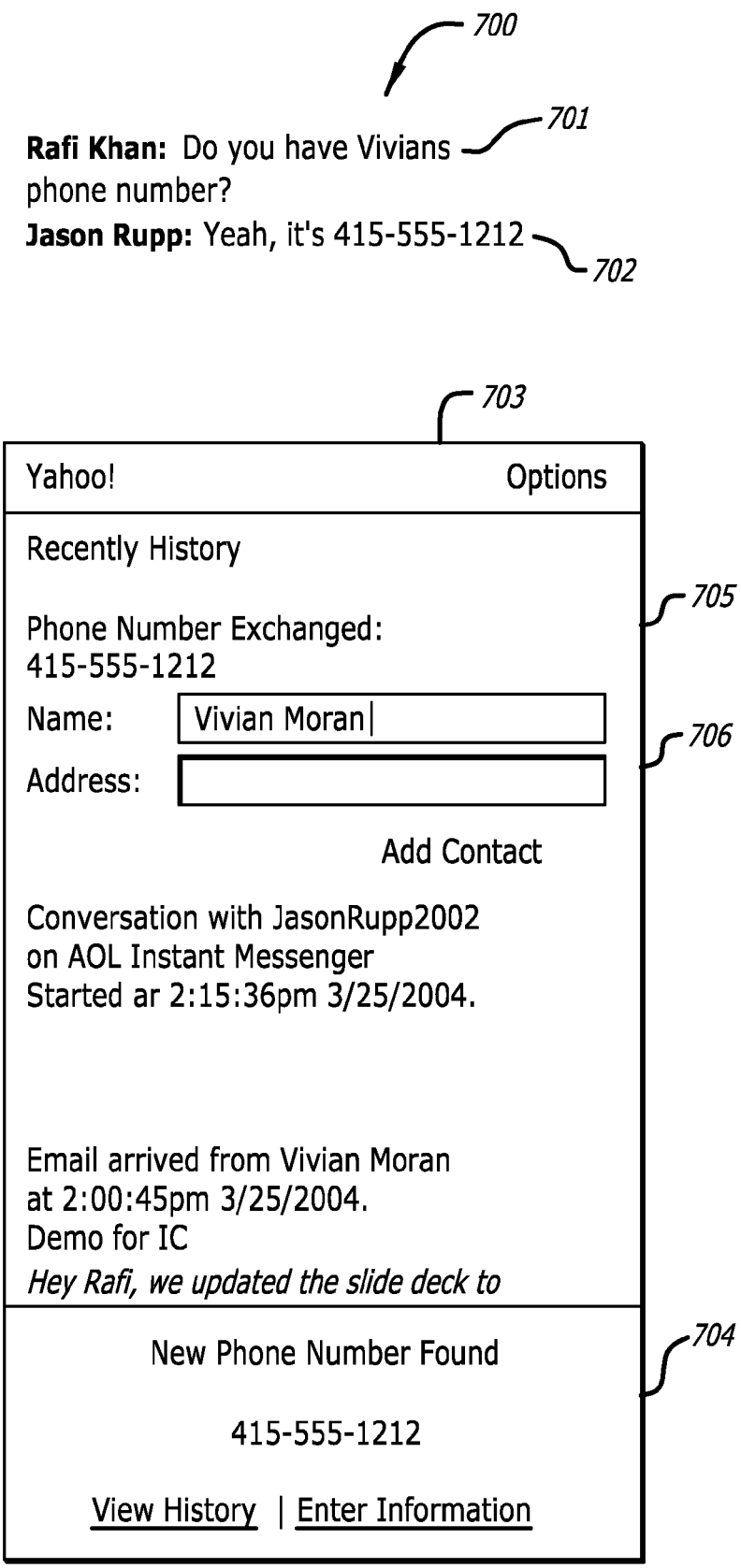
Figure 7E:
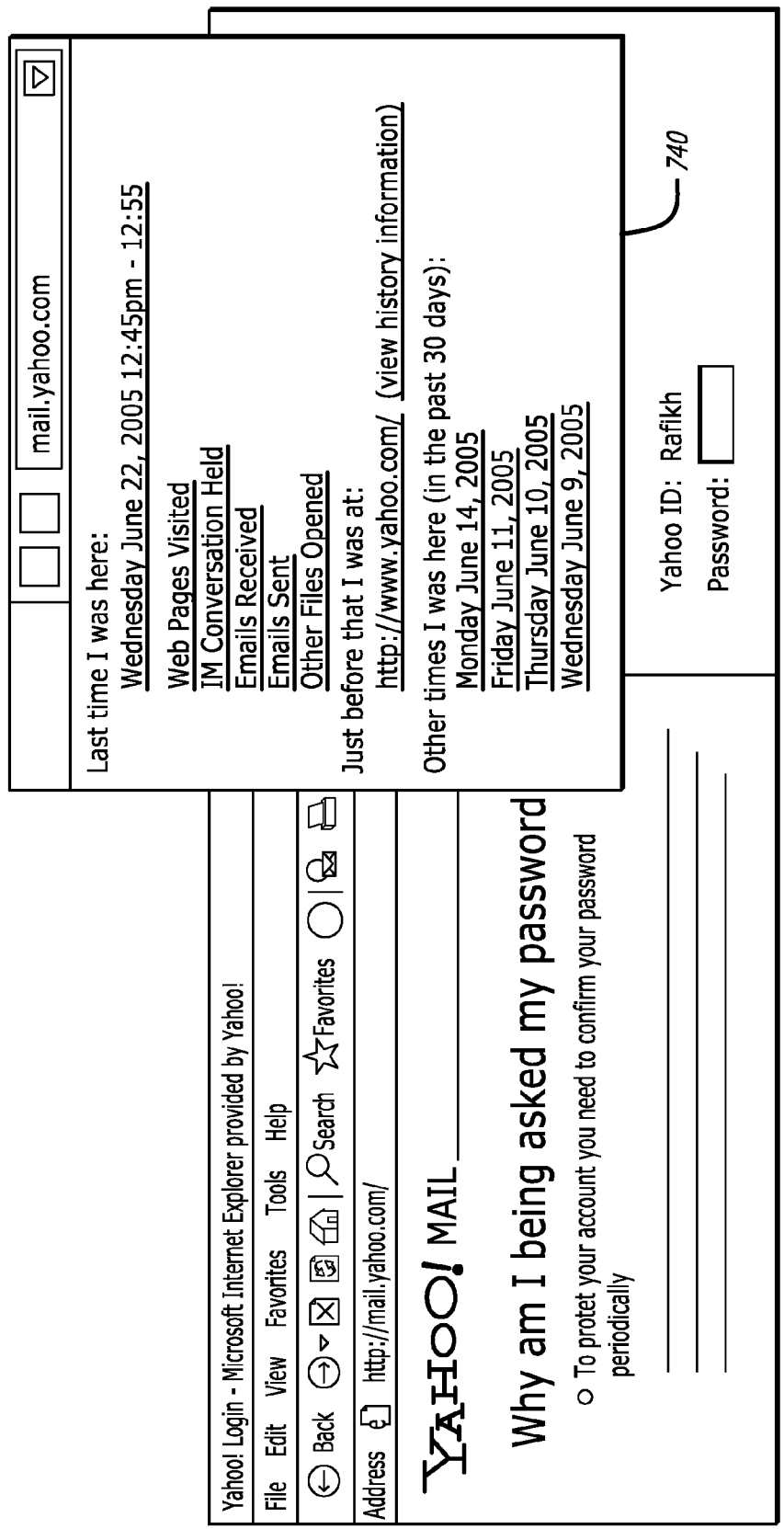
Figure 7G:
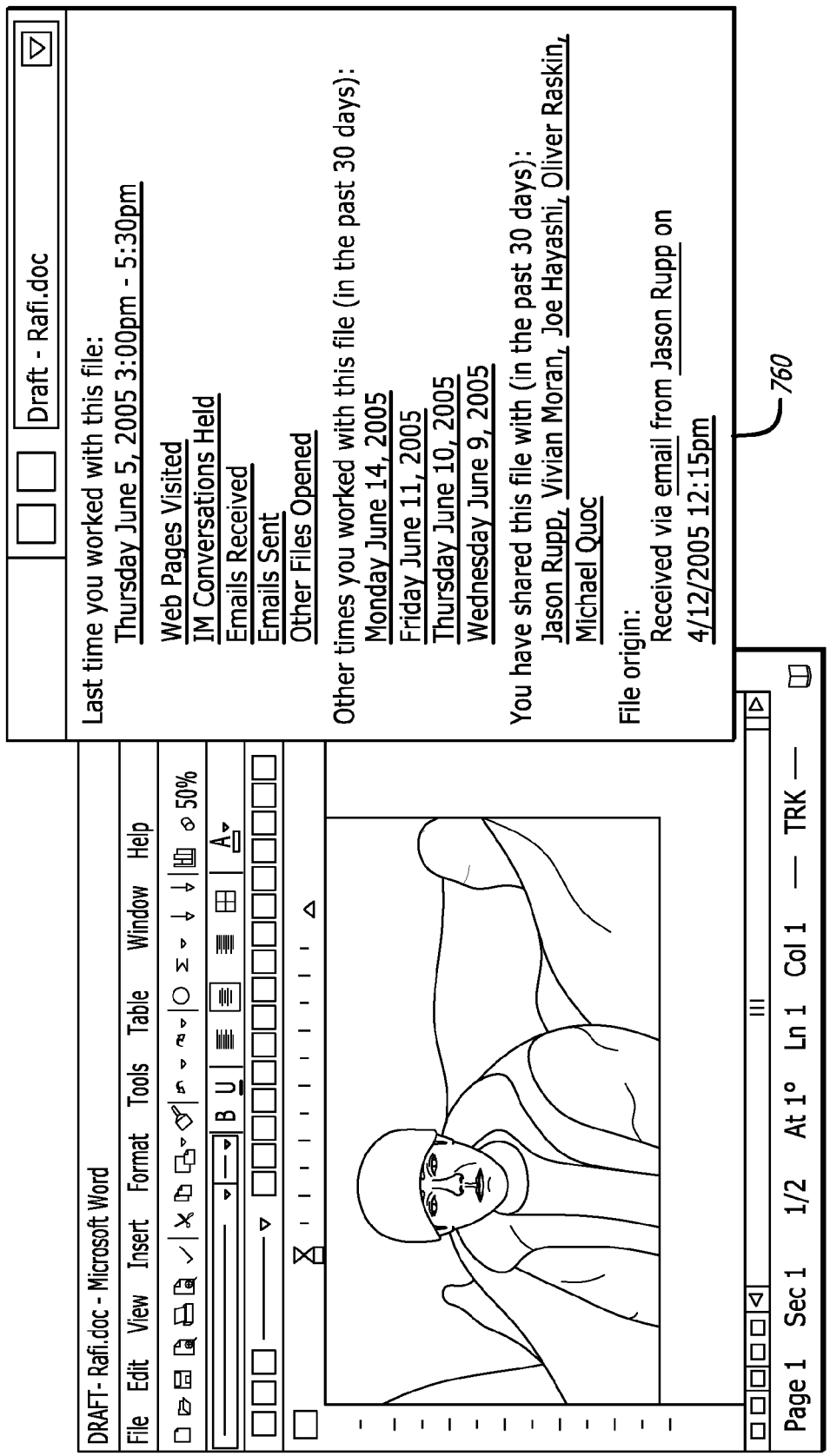

FIG. 7, which comprises FIGS. 7A to 7G, provide examples of displays provided in accordance with one or more embodiments of the present disclosure.

Figure 8:
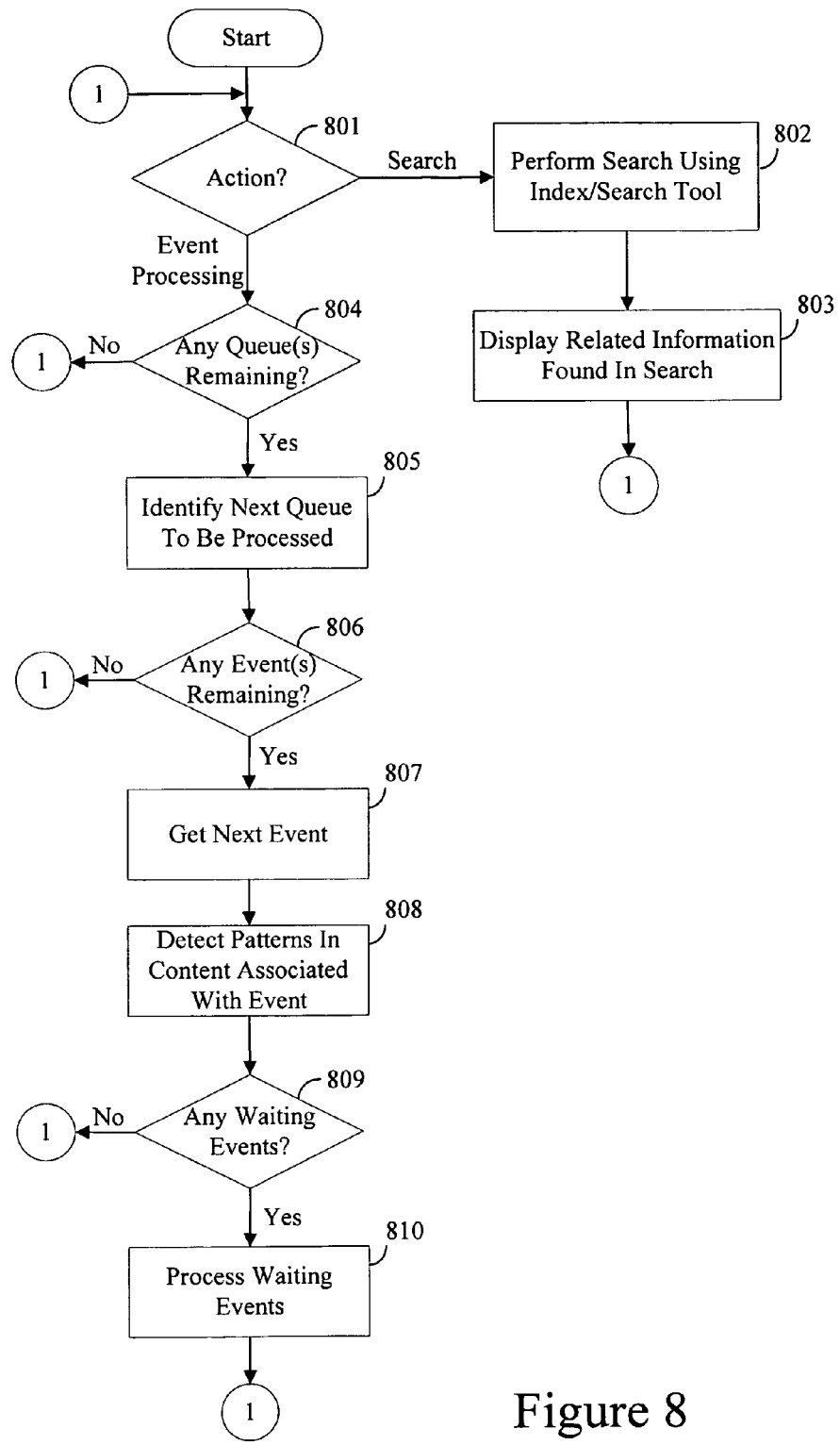

FIG. 8 provides an example of a process flow in accordance with one or more embodiments of the present disclosure.

DETAILED DESCRIPTION

In general, the present disclosure system and method for recognizing, storing, and retrieving information and associated context information.

Certain embodiments of the present disclosure will now be discussed with reference to the aforementioned figures, wherein like reference numerals refer to like components.

In accordance with one or more disclosed embodiments, an event and associated context information are identified and stored. By way of non-limiting example, an event can be a process start, process stop, file (or other item) open, file (or other item) close, new process spawned. In a case that an event identifies that a process opened a file, for example, embodiments of the present disclosure save the name of the file, the program that opened the file, together with date and time that the file was opened. In accordance with embodiments of the present disclosure, this information might supplement information already identified and indexed, such as that the file was received as an attachment in an email received at a certain date and time from a certain user. Embodiments of the present disclosure build an index associated with items, e.g., a files, applications, etc., and context information associated with the information item, e.g., the file was received in an email from the certain user and was opened in a word processing application program on a certain date and time. By way of additional non-limiting examples, context information can comprise information identifying a person or system component involved in a process start/stop, information associated with a file (or other item) that is opened or closed, such as a file name, location, etc., information identifying a circumstance (e.g., reason) a new process is spawned, etc.

In accordance with one or more embodiments, as a user interacts with a software application, e.g., an instant messenger or electronic mail application, information such as an electronic mail address or an instant messenger identifier, phone number, postal address, message content, date and/or time, etc. are identified. If the information is new, embodiments of the present disclosure can be used to save the information. For example, in a case that the new information is identified as a phone number, the information can be saved as contact information in an electronic address book. In addition to saving the information, context information can be saved. For example, information about how the phone number came to be identified, e.g., it was contained in a communication received by an instant messenger application program from another user, whose identification information can be saved as context information associated with the phone number. Information identifying the circumstances surrounding the receipt of the phone number (e.g., the date and time the phone number was received, the other applications open at the time the phone number was received) can be associated with the contact information. This information, which is referred to as context information, can be used to subsequently search for the phone number. For example, a user can search for phone numbers received from a certain user, or via the instant messenger application, or when a given application program was open, or at a given date and time, or while viewing a given web site.

By way of another non-limiting example, as a user browses the web using a browser application, embodiments of the present disclosure can detect that a search is being performed, and can automatically provide the user with additional search results from other search engines. In addition and in accordance with disclosed embodiments, the user can be prompted to save search results, address and phone number information, and the details surrounding the information in the user's address book. In addition to this information, context information, e.g., how the user found the information, can be saved. The saved contextual information can be used to search for the saved information. For example, the user can search for phone numbers found on the internet, addresses found on a specific web site, or phone numbers found while using the browser software application.

In accordance with embodiments disclosed herein, an indexing and search engine is used to build an index of information items and associated context information, which index can be searched to locate information and associated context. For example, the indexing and search engine can be used to search for recent instant messenger conversations, or recent electronic mail messages, that were received while a given word processing document was open by a word processing application. The indexing and search engine can be invoked to perform a search requested by the user, or it can be automatically invoked without a request from the user. To illustrate the latter by way of a non-limiting example, a user might receive an instant message from another user, which message includes information determined to be a name of a third user. In accordance with one or more embodiments, the indexing and search engine automatically searches the index to locate any information associated with the third user, such as the third user's avatar or display image, names of files that were sent to or from the third user via email or via messenger and appointments scheduled with the third user, for example.

FIG. 1, which comprises FIGS. 1A and 1B, provides examples of information displayed in accordance with one or more embodiments of the present disclosure. In the example shown in FIG. 1A, a user is contacted via an instant messenger application. Embodiments of the present disclosure recognize the contacting user and display a small toast, or other display window, with information associated with the user. In accordance with at least one embodiment, the display window is configured so as to be displayed automatically without request by a user. In accordance with such an embodiment, context information can be automatically displayed to the user in connection with the display of an instant message in a window displayed by the instant messenger application, for example.

Recent instant message conversations with the contacting user are located via the index, as well as two files, two calendar appointments shared with the contacting user, and links to this information are displayed in the toast. The contacted user has the option to click on any of the three links to see the conversations, the files or the calendar appointments. The contacted user can also decide to find and view all the information using a more detailed display. For example, with reference to FIG. 1B, the contacted user can elect to view additional information, such as recent conversations, related files, calendar appointments, and recent email. In accordance with one or more embodiments, the user can click on any of the items to see the information in full detail.

In accordance with one or more embodiments, contextual information can be associated with files as well as software application programs, such as word processing, browser, instant message, etc. software applications. The contextual information can be stored as metadata associated with, or as part of, the file or application. File and application access times can be tracked, as well as the manner in which the file or application is invoked, the application that used a file, other applications that were open while a file or application was in use, websites visited while a file or application was in use and search terms used to find websites and information, etc. The context information can be used to locate the files and/or applications. For example, a phone number can be located based on a website on which the user found the phone number (or vice versa), find a document using the name of the sender that sent the document (e.g., via an instant messenger or electronic mail application), find a contact based on who provided the contact information to the user, find a file based on the software applications that were open at the time the file was sent, opened, received, etc., find information based on the website from which the information originated, etc.

In addition and in accordance with one or more embodiments, context information can be used to identify undesired or unwanted files or programs, e.g., spyware, virus etc. For example, if a user finds a suspicious file, the user can use context information associated with the file to determine how the file was introduced onto the user's system, e.g., to determine that the file was installed when the user opened an email from an unknown sender, or visited a website unfamiliar to the user. In accordance with one or more embodiments, a spyware detection program might access information stored in accordance with embodiments of the present disclosure to determine the circumstances under which a program was installed on a user's computer. For example, using context information, it is possible to determine whether or not the installation was performed by a website suspected/known to be the source of spyware, and report this to the user.

FIG. 2 provides an architectural overview in accordance with embodiments of the present disclosure. In accordance with one or more embodiments disclosed herein, system 200 operates in the background on a computing system, and is transparent to the computing system user. System 200 comprises event queue 202, event wait list 204, context engine 206 and indexing and search engine 208. In accordance with one or more embodiments, indexing and search engine 208 are separate components. In accordance with at least one embodiment, each of desktop applications 210 has a corresponding event queue 202, which event queue stores messages received from the corresponding application. Queued messages are processed by context engine 206. Context engine 206 processes queued messages to identify information and relationships between the information (e.g., context information) to be indexed and/or stored by indexing and search engine 208. In accordance with one or more embodiments, the information can be stored in the form of metadata. Indexing and search engine 208 can be used to retrieve indexed information, such as information that provides context for a given item of information. For example, context engine 206 can store information which identifies the desktop application(s) 210 open when a given file was open using word processor 212A. In addition and in accordance with one or more embodiments, context engine 206 generates a context graph, as discussed in more detail below.

In accordance with one embodiment, a client 210 is a component separate from the desktop application 210, and operates in a manner transparent to the desktop application 210. Client 210 monitors a desktop application 212 and detects an event associated with the desktop application 212. If client 210 detects an event, it extracts information, e.g., information from the desktop application 212 and broadcasts a message as notification to system 200 of the event. The broadcast message can include an event type, information identifying the item for which context information is to be retained, and the context information, for example. In accordance with at least one embodiment, the message comprises a timestamp, a unique identifier, as well as other information associated with a given event (e.g., file name, content such as document, email instant message content, email address, instant messenger user identification). Of course, it should be apparent that other information, as well as other levels of detail of the information, can be passed to system 200.

To illustrate by way of a non-limiting example, in a case that the event is a "file open" event (e.g., such as might occur with word processor 212A), client 210A can broadcast a message identifying the type of event (e.g., a "file open" event type), together with the name and location of the file opened by application 212. To further illustrate, by way of a non-limiting example, in a case that the client 210 detects a new conversation in an instant messenger application 212D, the message broadcast by client 210D can include a "new conversation" event, together with the name of the person initiating the new conversation. In addition, the message can include the contents of the message. Another type of event that can be detected by client 210D is a "new message" event. In such a case, the message broadcast by client 210D can include the sender's identification as well as the contents of the message. By way of another non-limiting example, in a case of browser application 212C, client 210C can detect when the user opens a web site, and can broadcast a message as notification of such an event, together with the universal resource locator (URL) for the web site. In the case of email application 212B, client 210B can detect when a new email message is opened, and can forward a notification message, which includes the sender's email address, for example.

The messages from clients 210A to 210D are received into a corresponding event queue 201, e.g., event queues 202A to 202D, and are processed by context engine 206. In addition, pattern matcher 218 can parse information associated with an event, e.g., content in a message received from a client 210. Context engine 206 retrieves messages from event queue 202, and identifies connections between events. Events can be tied together chronologically, by application (e.g., an event queue 202 consists of events from a given desktop application 212 in accordance with at least one embodiment), or based on a pattern of information identified by pattern matcher 218, for example. As discussed above, events are assigned a unique number, or globally unique identifier ("GUID"), and each event has a timestamp, e.g., a time that the event's message is broadcast by client 210. System 200 can use a timestamp to connect events across applications, for example.

System 200 can request pattern matcher 218 to scan content to identify a pattern (e.g., URL, postal address, phone number, etc.). In accordance with one or more embodiments, pattern matcher 218 uses a library of regular expressions that it accesses, and then parses received information to identify a pattern. A regular expression is a language that can be used to describe a pattern (e.g., phone number, zip code, date, URL, address, UPC, MP3/IP3 tag, etc.). FIG. 3 provides examples of pattern matching expressions used in one or more embodiments of the present disclosure. Of course, it is recognized that one can define a regular expression, or other type of expression syntax, to find any pattern by describing the characteristics of the pattern using the expression syntax, and that any pattern so-defined can be added to the library used by the pattern matcher 218 to locate patterns. Patterns need not be limited to text, and can include images, digital audio, digital video, for example. In accordance with one or more embodiments, pattern matcher 218 can be instructed to dynamically create a regular expression to define a new pattern. For example, client 210 can detect a command (e.g., a key sequence or mouse button input), which an application, or application user, can instruct Pattern matcher 218 can be invoked by other than context engine 206. For example, client 210, or a desktop application 212, can request pattern matcher 218 to verify a piece of information, e.g., a phone number entered via the desktop application 212. To illustrate by way of non-limiting example, a user can input a command (e.g., a right click mouse button) to request the pattern matcher 218 to verify information based on its pattern. Alternatively, information input by the user can automatically be verified, so that information entered by a user into an input field can be analyzed by the pattern matcher 218 to confirm that it has the correct format, for example.

System 200, and context engine 206, can use services 216, such as search engine 216A and address book 216B. For example, context engine 206 can use search engine 216A to identify context information for a given information item, e.g., search engine 216A can be used to search the internet for information associated with a sender of an email. To further illustrate by way of non-limiting example, an address book 216B can be used to identify an email sender's name, postal address and/or phone number. It should be apparent that other services 216 can be used by system 200.

Context engine 206 analyzes events to identify information and related context information. In accordance with one or more embodiments, context engine 206 builds one or more context graphs based on the contents of event queues 202 to identify relationships and associated contexts. FIG. 4, which comprises FIGS. 4A and 4B, provides examples of context graphs in accordance with one or more embodiments of the present disclosure.

Referring to FIG. 4A, an example of a context graph is shown, which associates processes spawned by other processes. More particularly, process 401, which corresponds to a windowing desktop such as Microsoft Windows®, is the root of context graph 400. Events 402 to 404 correspond to an email program process (e.g., Microsoft Outlook®), presentation program process 403 (e.g., Microsoft PowerPoint®), instant messenger program process 404 (e.g., Yahoo!® Messenger) and browser program process (e.g., Microsoft Internet Explorer®) being spawned. Context engine 206 determines, using event queues 202, that email program process spawned in event 402 spawned browser program process, which resulted in event 406, as well as word processor program process (e.g., Microsoft Word®), which resulted in event 408, and that the browser program process associated with event 406 spawned a word program process, which resulted in event 409. In addition, context engine 206 can determine, using context graph 400, that event 404 corresponds to an instant messenger program process being spawned, which instant messenger program process spawned browser program process, which resulted in event 410, that the browser program process spawned zip program process (e.g., Microsoft WinZip) associated with event 411, and that browser program process associated with event 405 spawned a document reader program process (e.g., Adobe Acrobat®), which resulted in event 412. In addition and using context graph 400, context engine 206 can determine what application programs are open at a given time. Thus, for example, it is possible for context engine 206 to determine what applications are open when an email is opened by email program process 402.

In accordance with disclosed embodiments, context engine 206 can determine relationships between events occurring in different desktop applications, and identify context information associated with the related events.

FIG. 4B provides an example of a context graph 420 which identifies events associated with spawned processes and items (e.g., files, emails, web pages, etc.) manipulated by the spawned processes. Events 421 and 422 correspond to an email program process and a browser program process being spawned from desktop 401. Email program process of event 421 opens an email, "email opened" event 423, spawns a word processor program process (which corresponds to event 424), opens another email (which corresponds to event 406), spawns browser program process (which corresponds to event 427) and opens a third email (which corresponds to event 431). Word processor program process (corresponding to spawned process event 424), opens a document, "someFile.doc" (which corresponds to event 425). Browser program process (which corresponds to event 427), is used to view web pages ("open email" events 426 and 429), and download a zip file ("download file" event 430). Browser program process ("spawned process" event 422) is used to access a web site (event 435), view web pages, (events 433 and 434) and download "file.pdf" (event 432). Context graph 420 can be used by context engine 206 to identify that events associated with email program process 421 and word processor program process 424, for example, are related, and that "somefile.doc" opened via word processor program process 424 is related to email 423 opened by email program process 421.

In accordance with one or more embodiments, context engine 206 can associate events in one or more events queues, and can relate events and items across desktop applications 212. More particularly, in accordance with one or more embodiments, context engine 206 determines relationships between events and items corresponding to different desktop applications, using one or more context graphs, e.g., context graph 420, and an event wait list ("EWL") 204 of FIG. 2.

For example, when email program process (event 421) spawns word processor program process (event 424), e.g., in response to the user selecting a link from within an email message (e.g., which corresponds to "email open" event 423), the client 210 associated with email program process (event 421) notifies context engine 206, by way of an "event waiting" notification. In response to the "event waiting" notification, an entry is created in EWL 204 which indicates that context engine 206 should expect to receive a "file open" event from a word processor program process, e.g., word processor program process (event 424) spawned by email program process (event 421), in connection with the opening of the "someFile.doc" file (event 425). When a word processor program process (event 424) is spawned in response to operations occurring in connection with the email program process (the spawning of which corresponds to event 421), the email program's client 210 forwards the "spawned process" event (event 424) to its event queue 202. When the client 210 associated with word processor program process sends an event message notifying context engine 206 of the occurrence of an "open file" event (event 425) in connection with the word processor program process ("spawned process" event 424), which event is stored in event queue 202, context engine 206 can relate the "open email" event 423 with the "open file" event 425 using the "event waiting" EWL 204 entry, and can associate the "someFile.doc" file 425 with email 423.

In addition and by way of a non-limiting example, context engine 206 can further relate information contained in the email ("open email" event 423) with the "someFile.doc", as well as information for which pattern matcher 218 has identified a valid pattern (e.g., a valid sending email address). Context engine 206 can use index and searching engine 208 to retrieve additional information (e.g., name, address, company, phone number, etc.) of the sender based on the sending email address, e.g., using address book 216B, for example. In addition, context engine 206 can retrieve information from the subject line of the email 423, and/or the body of the email 423, for association with the file 425.

To further illustrate, by way of non-limiting example, context engine 206 can use EWL 204 to determine that the "myDownload.zip" file ("download file" event 430) was downloaded as a result of email (event 426) being opened, browser program process being spawned (event 427), and web pages being opened (events 428 and 429). For example, when the client 210 associated with spawned email program process (event 421) detects that a user has selected a hyperlink to a web page, client 210 can send an event message corresponding to this event, as well as an "event waiting" message to notify context engine that it should expect an "open web page" event from a browser program process spawned by the email program process. In addition, the client associated with the spawned browser program process ("spawn process" event 427) detects events corresponding to viewing web pages 428 and 429 and downloading "myDownload.zip" file 430, and forwards these events to event queue 202. The EWL 204 entry created in response to the "event waiting" message can be used in connection with the contents of the event queues of the email and browser program processes to associate the web pages 428 and 429 and the "myDownload.zip" file with email 426. Of course, as previously discussed, other context information (e.g., sender, subject, email message, etc.) can be extracted from the email 426 for additional context information. Indexing and search engine 208 can be used to store associations between the context information and the spawned programs and/or items to which the context information is associated. By way of another non-limiting example, context engine 206 can use EWL 204 to-determine that the "file.pdf" was downloaded as a result of browser program process being spawned (event 422), a web site being accessed (event 435) and web pages being visited (events 433 and 434).

Embodiments of the present disclosure can associate context information based on time and/or patterns. FIG. 5 provides an example of events and relationships based on time and pattern matches in accordance with at least one embodiment of the present disclosure. In accordance with one or more embodiments, a timestamp is associated with events in event queues 202. The timestamp can identify the time that an event was sent by client 210 to system 200, for example. Of course, in addition to, or as a replacement for, such a timestamp, it should be apparent that one or more other timestamps can be associated with an event. Each of columns 510 to 517 correspond to a time $T_1$ to $T_8$, respectively, of an event, and each of rows 521 to 523 correspond to an application. For example, event $A_1P_1$, in row 520 and column 510, occurred at time $T_1$. Event $A_1P_1$ comprises elements 501 to 503, which identify the application, "A" (e.g., word processor, instant messenger, browser, etc.), event identifier, "1", and a pattern identifier, "$P_1$".

In the example shown in FIG. 5, each event has a corresponding pattern, $P_n$, which is identified by pattern matcher 218. In accordance with at least one disclosed embodiment, pattern matcher 218 has identified the patterns for each of events 506, 507, 508 and 509. Using this information, context engine 206 determines that events 506, 507, 508 and 509 are related. In the example, it is assumed that applications "A", "B" and "C" correspond to instant messenger, word processing and email programs, respectively, and that patterns $P_3$ and $P_{11}$ correspond to an email address and a file name. In addition, it is assumed for the sake of this example, that event $A_2$, $B_2$, $B_4$ and $C_3$ correspond to an instant message being received, a document file being opened, the document file being saved, and an email message being sent, respectively.

Using this information, context engine 206 can determine that an email address sent by an instant messenger user, whose instant messenger identifier (e.g., which has a pattern $P_5$) is captured from event $A_2$, is used to send, in event $C_5$, a file, which was opened and then saved via events $B_2$ and $B_3$, respectively, to the email address received in event $A_2$. Context engine 206 can use the timeline shown in row 520 to identify a sequence of the events. In addition, the timeline can be used to expand or narrow the scope of the associations made by context engine 206. For example, based on a detected pattern, $P_5$, of information, an instant messenger identifier is associated with event $A_7$. If the instant messenger identifier is the same for both events $A_2$ and $A_7$, context engine 206 can create an association to indicate that the user sent a message to the sender of the email message at time $T_7$, and further that the message included some reference to the file identified using the file name pattern $P_{11}$. However, context engine 206 can be limited to a predefined time span, which may exclude time $T_7$, in order to conserve resources, for example. In such a case, context engine 206 would capture the association between events 506 to 509, but not the association between events 506 to 509 and event 518. Of course, expansion/reduction of the time span used by context engine 206, as well as other parameters which can be used to expand or reduce the scope of examination performed by context engine 206, are trade offs, which can be based on an end user's desire to conserve resources, e.g., processing bandwidth and/or memory/disk space.

FIG. 6 provides an example of a processing performed in accordance with one or more embodiments of the present disclosure. The processing, which can be performed by system 200, is in response to a user opening an email which contains a phone number, as shown in event block 602. In response to the event, pattern matcher 218 parses the email to identify information that has a phone number pattern and information having a user identification (e.g., user name) pattern. Context engine 206 uses the information identified by pattern matcher 218 to find related information using information location tools 606.

In the example shown, a data index 609 can include data stored in a local repository (e.g., memory of the user's computer, or accessible via a local area network), as well as remotely stored data (e.g., data stored on a remote server accessible via the internet). Context engine 206 uses a local index/search tool 607 to retrieve related information from a local repository. In addition, context engine 206 uses an internet search engine 608 to conduct one or more web/internet searches. The resulting data index 609 includes the phone number contained in the email opened by the user, together with information identifying the first time the user received email containing the identified phone number and identification of the individual that sent the phone number to the user. In addition, context engine 206 can be used to retrieve information about the email sender (e.g., address, phone number, files recently shared with the sender, dates and/or content of recent instant messenger conversations with the email sender, dates and/or content of recent emails with the sender, recent phone calls with the sender, notes taken in connection with the sender, and the sender's picture. Further still, context engine 206 can be used to conduct a web search to retrieve additional information based on information contained in the data index 609 (e.g., the sender's phone and/or email address). The information identified by context engine 206 can be displayed to the user at block 605.

In addition, context engine 206 can be used to store any new information in data index 608. For example, if information is retrieved from a web search which is not included in the local repository, context engine 206 can be used to save the information to data index 609. In accordance with one or more embodiments, the user is given an option to save some or all of the new information, as part of the user interface displayed in block 605.

FIG. 7, which comprises FIGS. 7A to 7G, provide examples of displays provided in accordance with one or more embodiments of the present disclosure. Display portion 700 is part of an instant messenger program user interface, which displays a portion of an instant messenger conversation. Instant message 701 requests an individual's phone number, and a reply instant message 702 provides a phone number. In accordance with embodiments of the present disclosure, pattern matcher 218 is used to recognize the phone number contained in instant message 702. Display 703 is provided by system 200, which alerts the user, in display portion 704, that a new phone number was found in instant message 702, and allows the user the option of viewing the history associated with the new phone number and/or entering additional information, e.g., a name and address associated with the phone number, in portion 706. In response to entry of contact information associated with the phone number, system 200 performs a query using index/search tool 208, and displays recent history in portion 705, e.g., recent instant messenger and email messages.

Referring to FIG. 7B, a dialog box 710 is displayed by system 200 in response to an address being entered in an input field of a web page displayed by a browser program, which address is entered to retrieve a map, for example. Pattern matcher 218 is used to identify the input as an address. Recognizing that the address was entered in a context of a web page provided by a "mapping" web site, system 200 provides dialog box 710, which provides the user with an opportunity to save the address in an address book, obtain and/or save driving directions. In addition, system 200 provides the user with an opportunity to conduct another search using the address information input to find local restaurants.

In accordance with one or more embodiments, system 200 can recognize a search query entered by the user, use the user's query as input to another search engine, and compare the results of the latter search with that of the former. Dialog box 720 can then be displayed to notify the user that there are additional search results available, as well as to allow the user to save the search.

FIG. 7D provides an example of a pull-down menu that is displayed by system 200 in response to detection of phone number input in a word processing program in accordance with one or more embodiments of the present disclosure. Pattern matcher 218 of system 200 is used to recognize the input as matching a phone number pattern. In response, system 200 displays menu 731, which provides the user with an option to add the phone number to the user's address book.

FIGS. 7E to 7G provide examples of displays provided in accordance with embodiments of the present disclosure. Referring to FIG. 7E, display 740 is provided by system 200 in association with a browser program, for example, and provides historical information associated with a given web page/site URL, e.g., last time the user visited the web page, as well as other web pages visited, instant messenger conversations held, emails received, emails sent, and other files opened, during the user's visit(s) to this web page. In addition, display 740 identifies the web page that was visited just prior to the user's visit to the current web page. The other times that the user visited this web page in the last thirty days is also provided in display 740.

Referring to FIG. 7F, display 750 is provided by system 200 in response to email received from the sender of a given email, for example, and provides a history of communications (e.g., other emails received from the sender, web pages associated with URLs received from the sender and instant messenger conversations with the sender) with the email sender in the last thirty days, files shared with the sender in the last thirty days, results of a network search (e.g., local and/or web search) using the sender's information (e.g., name, email address, etc.), and information retrieved from the user's address book using the sender's information.

FIG. 7G provides an example of a display 760 which is displayed by system 200 in connection with a word processing program. Display 760 identifies the last time the user worked on the file, as well as web pages visited, instant messenger conversations held, emails sent and received, and other files opened the last time the user opened the current file. In addition, display 760 identifies the other times the user worked on the file in the last thirty days. Display 760 identifies other users with which the file has been shared, and the file's origin (e.g., the file was received via an email from another user on the specified date and time).

FIG. 8 provides an example of a process flow in accordance with one or more embodiments of the present disclosure. At step 801, a determination is made as to whether an event is to be processed, or a search is to be performed by system 200. To process events, processing proceeds to step 804 to determine whether any of queues 202 have events queued for processing by system 200. If not, processing continues at step 801. If there is at least one queue 202 that contains an event to be processed, processing continues to identify the next queue to be processed, and to ensure that the next queue has events remaining to be processed, at steps 805 and 806. If the selected queue 202 has at least one event to be processed, processing continues at step 807 to retrieve the event from the queue 202. At step 808, pattern matcher 218 of system 200 is used to detect any patterns in the information processed. At step 809, a determination is made whether or not there are any events waiting for the queued event, using EWL 204. If so, processing continues at step 810 to process the EWL 204 entry. In either case, processing then continues at step 801 to process another action. In a case that the action is a search to be performed using system 200, processing continues at step 802 to perform the search using index/search tool 208, and to display the results of the search for the user at step 803. Processing continues at step 801 to process any remaining actions.

Embodiments of the present disclosure can be platform specific or platform independent (e.g., Macintosh, Microsoft or Unix platforms).

In accordance with one or more embodiments, desktop applications 212 communicate with system 200 via clients 210 using any inter-process communication (IPC) mechanism. Examples of IPC mechanisms can include, without limitation, sockets, message queues, COM message exchange, and/or message posts to threads. Using an IPC mechanism and in accordance with one or more embodiments, desktop applications 212, can broadcast, via clients 201, information (e.g., events, context information, file contents and other information associated with files, etc.) to be indexed by system 200. In addition, using an IPC mechanism, desktop applications 212 can receive a message from system 200 to confirm that the information was successfully received and indexed by the system 200. In accordance with one or more embodiments, the messages communicated between desktop applications 212 and system 200 are formatted in XML.

Using an IPC mechanism, a desktop application 212, and its corresponding client 201, can broadcast information about files that are opened, closed, and when new applications are spawned, as well as any other context information, for example. As discussed above, such messages can be stored in event queues 202. In response to such messages, system 200 processes the received messages and identifies information as context information. In accordance with one or more embodiments, context engine 206 tags the context information with a timestamp and the application from which the information originated, and index and searching engine 208 stores the context information, so that it can be subsequently searched.

In accordance with one or more embodiments, context information, as well as other information, received from a desktop application 212 and processed by system 200 can be rebroadcast to one or more services 216 registered with system 200.

In addition, as discussed above, information received from desktop applications 212 can be passed to pattern matcher 218 to determine whether the received information matches a predefined pattern known to pattern matcher 218 (e.g., phone number, postal address, email address, URL, etc.). If any information matching one or more predefined patterns is found, the information can be identified to services 216 as a type of information based on the matched patterns. The information forwarded to services 216 can be formatted in XML.

In accordance with one or more embodiments of the present disclosure, services 216 can be add-ons to system 200, which can operate to take information, e.g., context information, and process it so as to return a result. System 200 can then take the result and forward the result to one or more of the desktop applications 212 registered to receive the type of result generated by services 216. For example, a desktop application 212 can register itself with system 200 to receive internet search engine results, postal addresses, etc. In accordance with one or more embodiments, such information forwarded to desktop applications 212 is formatted in XML.

While the apparatus and method have been described in terms of what are presently considered to be the most practical and preferred embodiments, it is to be understood that the disclosure need not be limited to the disclosed embodiments. It is intended to cover various modifications and similar arrangements included within the spirit and scope of the claims, the scope of which should be accorded the broadest interpretation so as to encompass all such modifications and similar structures. The present disclosure includes any and all embodiments of the following claims.

What is claimed is:

1. A method comprising:
    monitoring, by a computing system, a plurality of applications being executed by the computing system, to detect one or more events that occur with the applications of the plurality, each of the detected one or more events having a context;
    identifying, by the computing system, the context and contextual information corresponding to the context of each one of the detected one or more events;
    receiving, by the computing system, a notice in connection with a first application of the plurality that an anticipated event that is yet to occur with a second application of the plurality is expected, detecting a second event occurring with the second application, identifying the second event as the anticipated event noticed in connection with the first application, and making an association between the second event that occurred with the second application and identified as the anticipated event and a first event of the one or more detected events, the first event occurring with the first application; and
    storing, by the computing system, information associated with each detected event, the stored information including the identified contextual information of the identified context of each detected event, the stored information identifying the association between the first and second events.

2. The method of claim 1, wherein said step of monitoring is transparent to the applications.

3. The method of claim 1, said step of storing information further comprising:
    building, by the computing system, a searchable index, the index for use in retrieving the stored information associated with the detected events and the corresponding contextual information.

4. The method of claim 1, further comprising:
    creating, by the computing system, a context graph comprising a node corresponding to each of the detected events.

5. The method of claim 1, the method further comprising:
    creating, by the computing system in response to receiving the notice in connection with the first application, an entry in an event waiting list for the anticipated event, the entry for use in identifying the second event as the anticipated event;
    determining, by the computing system and using the entry in the event waiting list, that the second event is the anticipated event;
    storing, by the computing system, as part of the contextual information an association between the first event that occurred with the first application and the second event that occurred with the second application.

6. The method of claim 5, wherein one or more detected events occur between occurrence of the first and second events.

7. The method of claim 1, wherein the step of identifying contextual information further comprises:
    examining, by the computing system, information associated with a detected event to identify at least one pattern; and
    extracting, by the computing system and from the information, at least one information item corresponding to an identified pattern.

8. The method of claim 7, further comprising:
    associating, by the computing system, two or more detected events based on a time of occurrence associated with each of the two or more detected events.

9. The method of claim 7, further comprising:
    associating, by the computing system, two or more detected events based on at least one pattern identified in connection with the information associated with the two or more detected events.

10. The method of claim 7, wherein the at least one pattern is one of a time, date, universal resource locator, postal address and phone number.

11. The method of claim 7, wherein the at least one pattern is defined using a regular expression.

12. The method of claim 7, wherein each of the detected events has associated information identifying an application of the plurality, a time of the detected event and at least one identified pattern from information associated with detected event.

13. The method of claim 12, further comprising:
identifying, by the computing system, relationships between two or more detected events using at least a portion of the information identifying an application of the plurality, a time of the detected event and at least one identified pattern from information associated with the two or more detected events.

14. The method of claim 13, the step of identifying relationships between two or more detected events further using a predetermined time span.

15. The method of claim 14, wherein identifying relationships between two or more detected events using the information associated with the detected events and a predetermined time span further comprising:
identifying, by the computing system, a relationship between the two or more detected events using the contextual information associated with the detected events and the predetermined time span, the identifying being based at least in part on a determination whether the time of the two or more detected events falls within the predetermined time span.

16. A system comprising:
at least one computing system configured to execute:
a plurality of clients corresponding to a plurality of applications being executed by the computer system, each client corresponding to one application in the plurality of applications and being separate from the corresponding application, each client being operative to monitor the corresponding application to detect one or more events associated with the corresponding application, each of the detected one or more events having a context, the client being further operative to provide notice to a context engine that an anticipated event that is yet to occur with an application of the plurality is expected;
the context engine operative to identify the context and context information corresponding to the context of each one of the detected one or more events, the context engine further operative to receive, from a first application's client, a notice that an anticipated event that is yet to occur is expected with a second application of the plurality, receive, from the second application's client, a notice that a second event occurred with the second application, identify the second event as the anticipated event noticed by the first application's client, and make an association between the second event as the anticipated event noticed by the first application's client and a first event of the one or more detected events, the first event occurring with the first application;
an index and search engine operative to store information associated with each detected event, the stored information including the identified contextual information of the identified context of each detected event the stored information identifying the association between the first and second events.

17. The system of claim 16, wherein each client is operative to monitor its corresponding application in a manner transparent to its corresponding application.

18. The system of claim 16, said index and search engine is further operative to build a searchable index, the index for use to retrieve the stored information associated with the detected events and the corresponding contextual information.

19. The system of claim 16, said context engine further operative to create a context graph comprising a node corresponding to each of the detected events.

20. The system of claim 16, the context engine further operative to:
create, in response to receipt of the notice from the first application's client, an entry in an event waiting list for the anticipated event, the entry for use in identifying the second event as the anticipated event;
determine, using the entry in the event waiting list, that the second event is the anticipated event;
store as part of the contextual information an association between the first event that occurred with the first application and the second event that occurred with the second application.

21. The system of claim 20, wherein one or more detected events occur between occurrence of the first and second events.

22. The system of claim 16, further comprising a pattern matcher operative to examine information associated with a detected event to identify at least one pattern, said context engine is further operative to extract from the information at least one information item corresponding to an identified pattern.

23. The system of claim 22, wherein said context engine is further operative to associate two or more detected events based on a time of occurrence associated with each of the two or more detected events.

24. The system of claim 22, wherein said context engine is further operative to associate two or more detected events based on at least one pattern identified in connection with the information associated with the two or more detected events.

25. The system of claim 22, wherein the at least one pattern is one of a time, date, universal resource locator, postal address and phone number.

26. The system of claim 22, wherein the at least one pattern is defined using a regular expression.

27. The system of claim 22, wherein each of the detected events has associated information identifying an application of the plurality, a time of the detected event and at least one identified pattern from information associated with detected event.

28. The system of claim 27, said context engine is further operative to identify relationships between two or more detected events using at least a portion of the information identifying an application of the plurality, a time of the detected event and at least one identified pattern from information associated with detected event.

29. The system of claim 27, wherein said context engine is further operative to identify a relationship between two or more detected events using the information associated with the detected events and a predetermined time span.

30. The system of claim 29, wherein said context engine operative to identify a relationship between two or more detected events using the information associated with the detected events and the predetermined time span is further operative to identify the relationship between two or more detected events based at least in part on the time of the two or more detected events falling within the predetermined time span.

* * * * *